(12) United States Patent
Meiri et al.

(10) Patent No.: US 10,051,436 B2
(45) Date of Patent: Aug. 14, 2018

(54) COMPRESSION WITH MULTICAST DICTIONARY

(71) Applicant: Gilat Satellite Networks Ltd., Petah Tikva (IL)

(72) Inventors: Tzvika Meiri, Modiin (IL); Oren Markovitz, Raanana (IL); Nitay Argov, Tel Mond (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 103 days.

(21) Appl. No.: 15/013,624

(22) Filed: Feb. 2, 2016

(65) Prior Publication Data

US 2016/0234655 A1  Aug. 11, 2016

Related U.S. Application Data

(60) Provisional application No. 62/113,598, filed on Feb. 9, 2015.

(51) Int. Cl.
*H04W 4/06* (2009.01)
*H04L 1/16* (2006.01)

(52) U.S. Cl.
CPC ............. *H04W 4/06* (2013.01); *H04L 1/1657* (2013.01)

(58) Field of Classification Search
CPC ........ H04W 4/06; H04W 4/00; H04L 1/1657; H04L 1/1642
USPC ....................................................... 370/312
See application file for complete search history.

(56) References Cited

U.S. PATENT DOCUMENTS

| | | | | |
|---|---|---|---|---|
| 2003/0076826 A1* | 4/2003 | Blasiak | ............... | H04L 12/1868 370/389 |
| 2003/0182446 A1* | 9/2003 | Koide | ................. | H04L 12/1868 709/238 |
| 2003/0193948 A1* | 10/2003 | Hatae | ................ | H04L 12/40052 370/392 |
| 2006/0045099 A1* | 3/2006 | Chang | .................. | H04L 69/166 370/400 |
| 2015/0127715 A1* | 5/2015 | Dankberg | ........... | H04L 67/2857 709/203 |
| 2015/0358136 A1* | 12/2015 | Medard | ................. | H04L 5/0055 370/441 |
| 2015/0381774 A1* | 12/2015 | Courtice | ................... | H04L 1/00 370/310 |

* cited by examiner

*Primary Examiner* — Michael Thier
*Assistant Examiner* — Rownak Islam
(74) *Attorney, Agent, or Firm* — Banner & Witcoff, Ltd.

(57) ABSTRACT

Some applications that cannot operate over a non-reliable delivery service may operate sufficiently well over less than a completely guaranteed delivery service. Such an application may perform relatively well even if some transmitted data is not delivered, as long as the application has information regarding which receiving entities received what part of the data. In a point-to-multipoint system, data may be transmitted from a source node to a plurality of destination nodes using a plurality of multicast datagrams. Methods are presented herein for efficiently enabling the source node to determine for each of the plurality of destination nodes which multicast datagrams were successfully received. Also presented are methods for compressing data transmitted from the source node to the destination nodes, wherein a compression dictionary is transmitted from the source node to the destination node using multicast datagrams.

12 Claims, 6 Drawing Sheets

COMPRESSION WITH MULTICAST DICTIONARY

PRIORITY CLAIM

This application claims priority to U.S. Provisional Patent Application Ser. No. 62/113,598, filed Feb. 9, 2015, and entitled "Compression with Multicast Dictionary," the disclosure of which is incorporated by reference herein in its entirety and made part hereof.

FIELD

Aspects of the disclosure pertain to the field of data communication in general and to point-to-multipoint data communication in particular.

BACKGROUND

In data communications, two modes of data transfer are commonly used. One mode is the datagram delivery mode, which does not guarantee delivery of data being transmitted in this mode. The other mode is the guaranteed delivery mode, which uses means such as acknowledgement messages, timers and retransmission protocols to guarantee delivery of the data transmitted in this mode. The most common protocols associated with these data transfer modes are UDP (User Datagram Protocol) for datagram delivery and TCP (Transmission Control Protocol) for guaranteed delivery.

In data communication systems offering true Point-to-Multipoint (P2MP) data transmission (e.g. satellite communication systems) multicast traffic is often delivered using a non-guaranteed delivery mode. This is quite natural and self-evident, since implementing a guaranteed delivery protocol over a multicast channel has been proven to be quite a challenge. Over the years some methods were suggested for implementing a P2MP guaranteed delivery data transfer mode, yet all these methods had significant shortcomings. Some of these methods involved use of complicated retransmission protocols, others were very chatty (i.e. produced significant volumes of overhead traffic) in both directions of communication, and in many cases these methods did not really guarantee delivery in all scenarios. In fact, none of these methods was commonly accepted for applications for which use of UDP is not good enough.

Two problems have to be solved in order to provide a guaranteed delivery service over a multicast channel. The first is a non-responding destination problem. Even a single non-responding (malfunctioning) destination may cause a data source to retransmit the traffic indefinitely. This may lead to a growing waste of channel capacity, up to a point where the communication channel could be rendered useless due to being totally filled with senseless retransmissions. The second is a network sizing problem. Several retransmission cycles might be required until all destinations receive a transmission and acknowledge its reception. As the number of retransmission cycles required might be unpredictable, it might not be possible to properly size the total capacity (bandwidth) needed for such a communication system. If the capacity is undersized, the system might not function properly. If the capacity is oversized, the system might be too expensive to operate, or the cost of the service might be too high.

Stream Compression is a known, highly efficient data compression technology. Stream Compression is based on monitoring traffic that flows through a source node, identifying repetitions of data blocks (sequences) in the traffic, and building a dictionary for the identified data blocks (sequences), wherein each identified data block is assigned a short identifier (shorter than the data block itself). A copy of the dictionary is then sent by the source node to a destination node, and is saved in a memory at the destination node. After verifying that the dictionary is saved in the destination node, and identifying another repetition of a data block in the traffic that is already included in the dictionary, the source node transmits a short identifier assigned to the data block (according to the dictionary) instead of the data block itself, thus compressing the data, i.e. reducing the volume of data being transmitted. Upon receiving the short identifier, the destination node replaces the short identifier with the corresponding data block in accordance with the saved dictionary, thus decompressing the data and restoring it to its original form.

In order to use Stream Compression in a P2MP system, the dictionary needs to be transmitted to all destination nodes and each destination node must save a copy of the dictionary. Once all destination nodes have copies of the dictionary, the source node can replace, upon detecting an instance of a data block already included in the dictionary in the traffic to be transmitted to the destination nodes, the instance of the data block with a short identifier in accordance with the dictionary. Since each of the destination nodes has a copy of the dictionary, any destination node receiving the short identifier can replace it with the original data block.

In a P2MP system, in order to efficiently transmit a Stream Compression dictionary to a plurality of destination nodes, a multicast transmission has to be used. However, multicast is a non-reliable delivery service. On the other hand, in order to achieve an efficient and fault free operation of the Stream Compression algorithm, it is crucial that the source node does not attempt to compress data blocks that are not included in the copies of the dictionary stored at the destination nodes. The cost of an error (i.e. of an attempt to compress a data block not existing in a copy of the dictionary stored at a destination node) is rather high and could involve any of needing retransmissions, delivering erroneous data to any number of applications at the destination node, and a complete loss of data.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some aspects of the disclosure in a simplified form as a prelude to the description below.

In accordance with aspects of the disclosure, an Acknowledged Multicast data transfer mode may be used in P2MP communication systems. In some embodiments, Acknowledged Multicast may be used in satellite communication systems. The Acknowledged Multicast data transfer mode might not be considered a guaranteed delivery service or protocol, for example, since it might not include means, protocols or methods for data retransmission. However, Acknowledged Multicast may provide an efficient way for one or more destination nodes to report, which multicast datagrams were successfully received and/or which datagrams were lost by each of the one or more destination nodes.

In some embodiments, a source node in a communication system may transmit at least one multicast transmission to one or more destination nodes of the communication system. The at least one multicast transmission may include data corresponding to a block in a storage associated with the source node, a multicast acknowledgement sequence number (MASN), and a block index corresponding to a relative location of the block in the storage associated with the source node. The source node may, responsive to transmitting the at least one multicast transmission, set one or more indicators corresponding to the block index included in the at least one multicast transmission. The one or more indicators may be included in one or more maps corresponding to one or more storages associated with the one or more destination nodes. The source node may set the one or more indicators to indicate that the data stored in the corresponding block in the one or more storages associated with the one or more destination nodes is invalid. Responsive to transmitting the at least one multicast transmission, the source node may further add at least one record to a transmission table, wherein the at least one record comprises an MASN and a block index corresponding to the at least one multicast transmission.

The source node may receive at least one acknowledgement message from at least one destination node of the one or more destination nodes. The acknowledgement message may include a first MASN corresponding to a first multicast transmission of one or more multicast transmissions and one or more indicators corresponding to one or more MASNs consecutively following the first MASN. Each one of the one or more indicators may be configured to indicate whether data corresponding to the respective MASN was correctly received at the at least one of the one or more destination nodes. The source node may set one or more indicators in a map corresponding to the storage associated with the at least one destination node in accordance with the first MASN and the one or more indicators of the at least one acknowledgement message. Setting the one or more indicators in the map may comprise setting the one or more indicators in the map to indicate that one or more blocks in the storage associated with the at least one destination are valid.

In some embodiments, the number of blocks in the storage associated with the source node may be the same as the number of blocks in each of the one or more storages associated with the one or more destination nodes. Furthermore, the blocks in the storage associated with the source node and in the one or more storages associated with the one or more destination nodes may be of a same size. In some embodiments, the source node may be configured to increase the MASN by one with each subsequent multicast transmission.

In some embodiments, at least one destination node of the one or more destination nodes may be configured to transmit the at least one acknowledgement message in accordance with a first interval. The source node may remove the at least one record from the transmission table in accordance with a second interval. The second interval may be shorter than a time interval it takes for MASNs to wrap-around. The second interval may be of the same duration or longer than the first interval plus a round-trip latency of the communication system. In some embodiments, the communication system may be a satellite communication system, the source node may be a hub of the satellite communication system, and the one or more destination nodes may be one or more satellite communication terminals.

In some embodiments, setting one or more indicators in a map may include determining, in accordance with any of the first MASN and the one or more indicators included in the acknowledgement message, at least one MASN corresponding to at least one block that was correctly received at the at least one destination node. Setting the one or more indicators may further include translating the at least one MASN to at least one block index in accordance with at least one record included in the transmission table, and setting, in accordance with the at least one block index, at least one indicator corresponding to the at least one block in the map corresponding to the at least one destination node to indicate that the data stored in the corresponding at least one block in the storage associated with the at least one destination is valid.

In accordance with aspects of the disclosure, an Acknowledged Multicast method may be used in a point-to-multipoint (P2MP) communications system for at least the purpose of supporting data compression using a Stream Compression technique. A source node of the communication system may be configured to generate a (compression) dictionary and to distribute the dictionary to one or more destination nodes of the communication system using one or more multicast transmissions. The source node may receive at least one acknowledgement message from at least one destination node of the one or more destination nodes. The acknowledgement message may correspond to one or more parts of the compression dictionary included in one or more of the one or more multicast transmissions. The source node may set in accordance with the at least one acknowledgement message, one or more indicators in a map corresponding to the at least one destination node. Setting the one or more indicators may include setting the one or more indicators to indicate that one or more parts of the compression dictionary corresponding to the at least one acknowledgement message are valid at the at least one destination node. The source node may further determine that data to be transmitted to the at least one destination node can be compressed in accordance with at least one part of the compression dictionary. The source node may further determine whether the at least one part of the compression dictionary is valid at the at least one destination node. The source node may transmit the data to the at least one destination node without compressing the data if the at least one part of the compression dictionary is invalid at the at least one destination node.

In some embodiments, if the at least one part of the compression dictionary is valid at the at least one destination node, the source node may compress the data in accordance with the at least one part of the compression dictionary to generate compressed data and transmit the compressed data to the at least one destination node. In some embodiments, the source node may set one or more indicators corresponding to at least one part of the compression dictionary corresponding to at least one multicast transmission of the one or more multicast transmissions. The one or more indicators may be included in one or more maps corresponding to the one or more destination nodes. Setting the one or more indicators may comprise setting the one or more indicators to indicate that the at least one part of the compression dictionary is invalid at the one or more destination nodes. In some embodiments, the communication system may be a satellite communication system, the source node may be a hub of the satellite communication system, and the one or more destination nodes may be one or more satellite communication terminals.

BRIEF DESCRIPTION OF THE DRAWINGS

Figure 1:
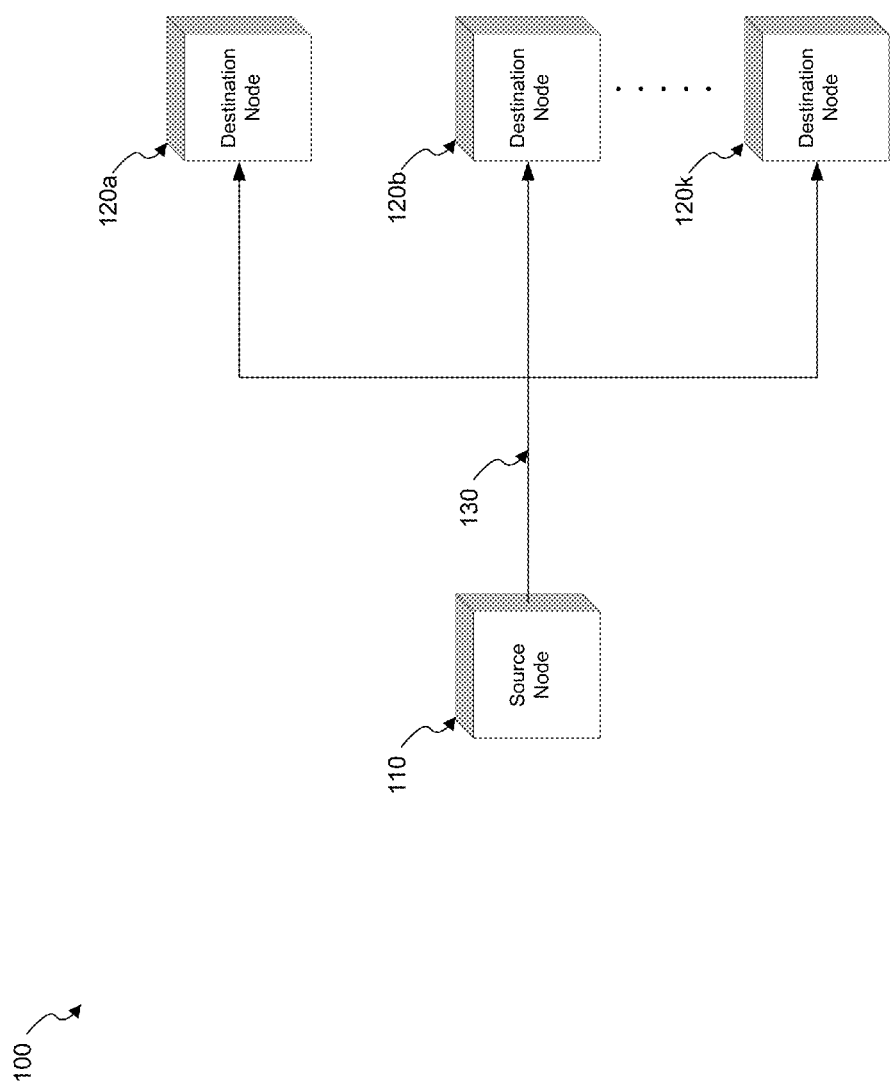
Figure 2:
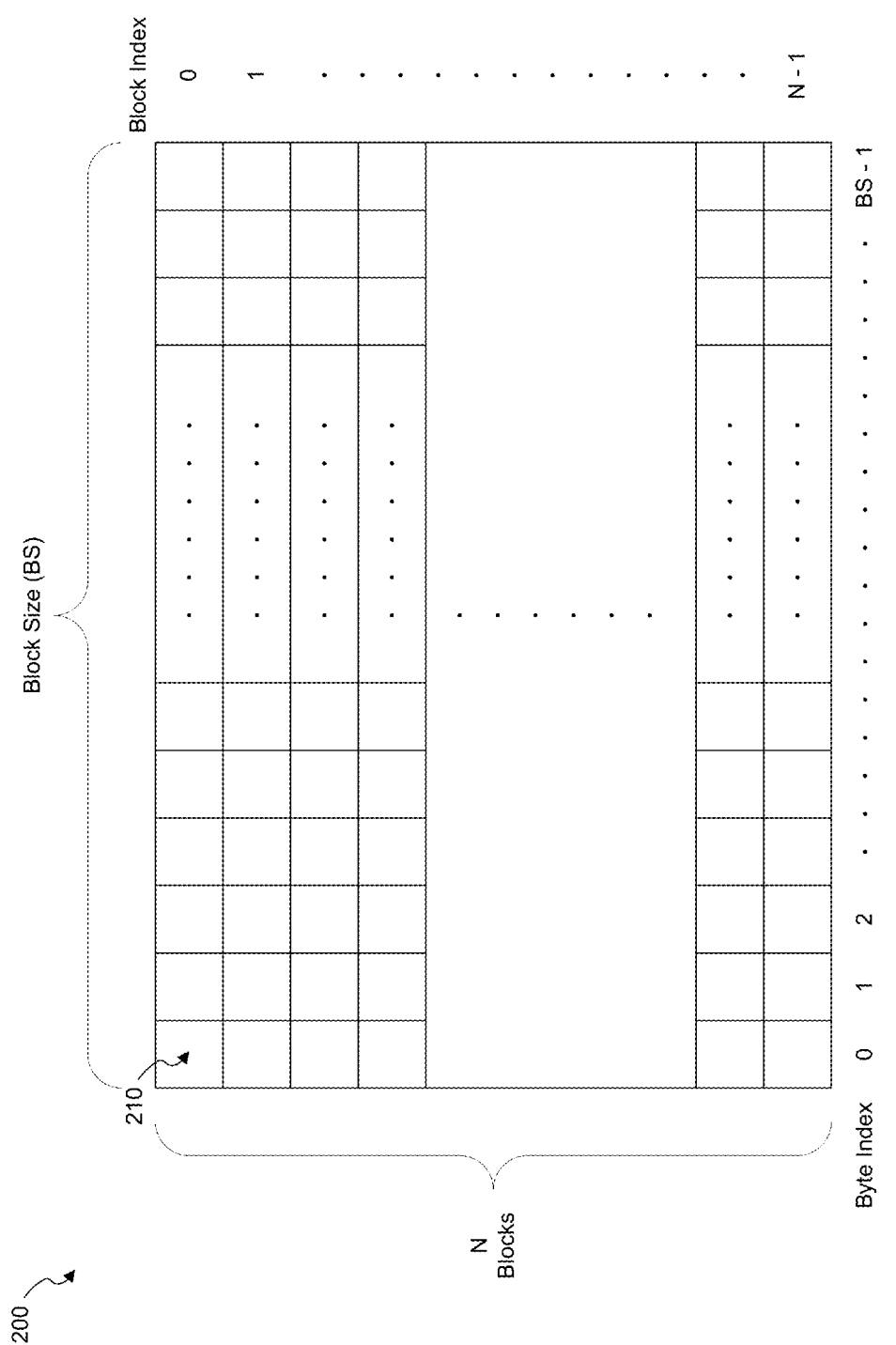
Figure 3:
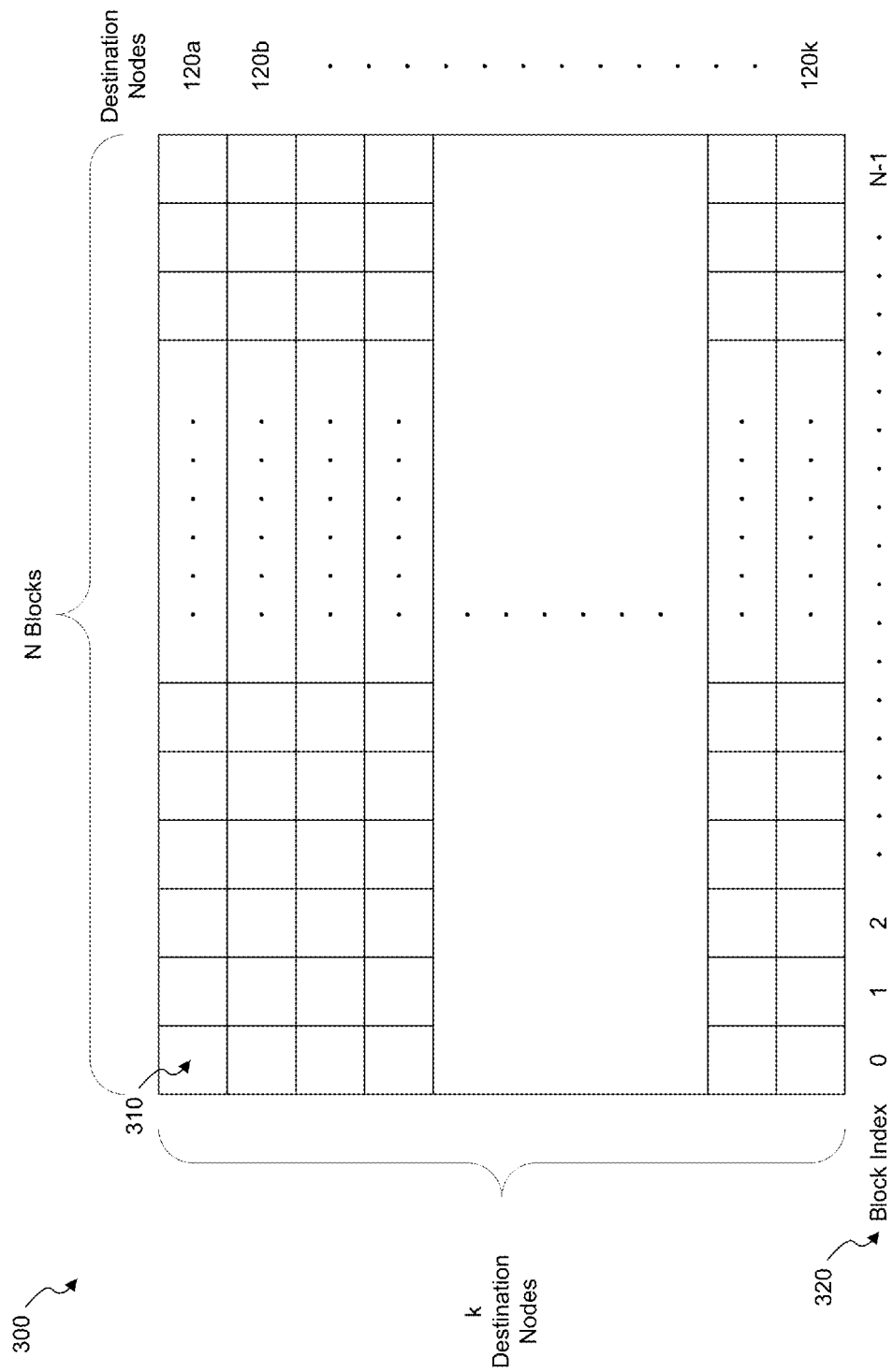
Figure 4:
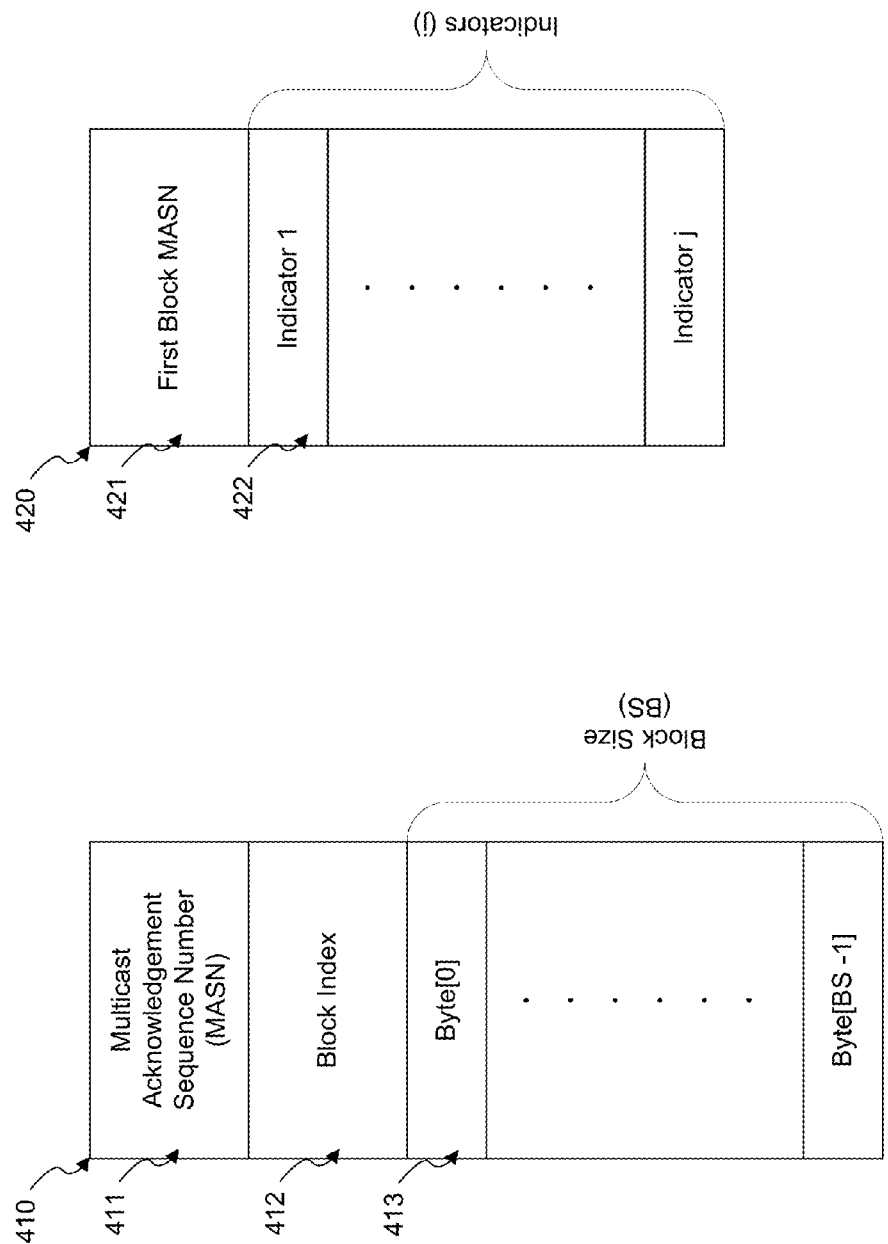
Figure 5:
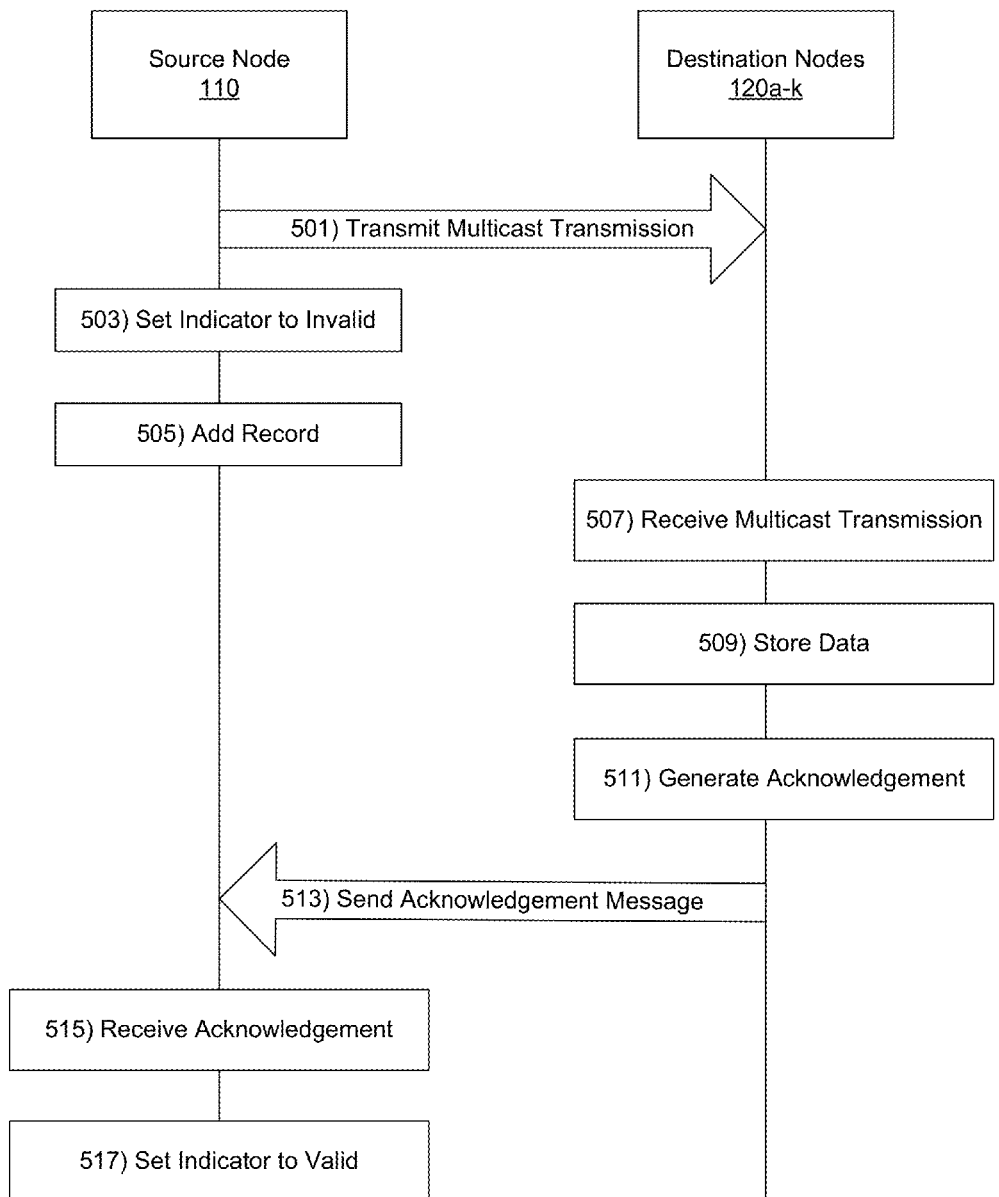

Having thus described the disclosure in general terms, reference will now be made to the accompanying drawings, which are not necessarily drawn to scale, and wherein:

FIG. 1 shows a communication system in accordance with aspects of the disclosure;

FIG. 2 shows a block diagram of content storage in accordance with aspects of the disclosure;

FIG. 3 shows a block diagram of a memory map in accordance with aspects of the disclosure;

FIG. 4 shows an example of a multicast transmission and an acknowledgement GTP header format in accordance with aspects of the disclosure;

FIG. 5 illustrates an example of an Acknowledged Multicast; and

Figure 6:
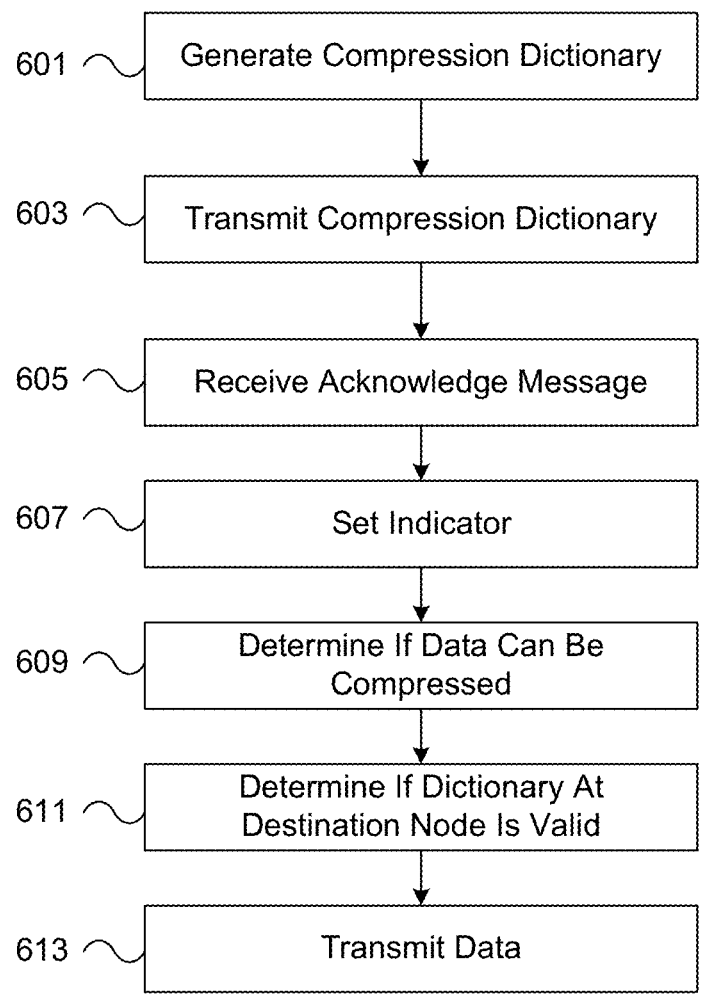

FIG. 6 illustrates an example method of using a stream compression technique.

DETAILED DESCRIPTION

Referring to FIG. 1, communication system 100 may comprise at least a source node (110) and one or more destination nodes (120a-k). The source node (110) may be configured to transmit content using at least one or more multicast transmissions (130) and the destination nodes may be configured to receive content, e.g. through receiving at least the one or more multicast transmissions (130).

In some embodiments, each of the one or more destination nodes (120a-k) may comprise a storage configured at least for storing data. A storage corresponding to a destination node of the one or more destination nodes (120a-k) may be implemented using any of one or more volatile data storage devices (e.g. volatile memory devices) and/or one or more non-volatile data storage devices (e.g. non-volatile memory devices, solid-state drives, hard drives, etc.) that may be included in or associated with the respective destination node.

In some embodiments, the source node (110) of the communication system (100) may also comprise a storage configured at least for storing data and to use at least a portion of its corresponding storage as a content storage (e.g., FIG. 2, content storage 200) for at least the purpose of storing content that may be transmitted to the one or more destination nodes (120a-k), e.g. in multicast transmissions. In some embodiments, the content storage corresponding to the source node (110) may be of a same capacity (e.g. M) as the capacity of each of the content storages corresponding to the one or more destination nodes (120a-k). The content storage corresponding to the source node (110) may be (e.g. logically) segmented into one or more blocks (e.g. N blocks). All of the blocks may be of a same size (e.g. BS, wherein BS=M/N). In some embodiments, the number of blocks (N) and the block size (BS) associated with the content storage corresponding to the source node (110) may be the same as the number of blocks (N) and the block size (BS) associated with each of the content storages corresponding to the one or more destination nodes (120a-k), respectively.

In an aspect of the disclosure, the source node (110) and/or the one or more destination nodes (120a-k) may be configured to use a method for transferring data from the source node (110) to the one or more destination nodes (120a-k), referred to herein as "Acknowledged Multicast". In some embodiments, Acknowledged Multicast may allow the source node (110) to efficiently manage the one or more content storages corresponding to the one or more destination nodes (120a-k) by using low complexity software code and/or using low communications overheads. In some embodiments, Acknowledged Multicast may allow the source node (110) to determine whether content that may have been transmitted using one or more multicast transmissions (e.g., 130) may be stored in any of the one or more content storages corresponding to the one or more destination nodes (120a-k).

In reference to FIG. 3, the source node (110) may be configured to maintain, in real-time or substantially in real-time, one or more maps (300) that may correspond to the one or more content storages corresponding to the one or more destination nodes (120a-k). A content storage associated with a destination node of the one or more destination nodes (120a-k) may be associated with N blocks. Each of the N blocks may be associated with a block index 320. A map of the one or more maps (300) corresponding to a content storage associated with a destination node of the one or more destination nodes (120a-k) may comprise one or more indicators (e.g., indicator 310). Each indicator of the one or more indicators may correspond to a block associated with the respective content storage. In some embodiments, a map corresponding to a content storage may comprise at least as many indicators as the number of blocks associated with the content storage (e.g., N), such that each block associated with the content storage may be associated with at least one indicator in the map corresponding to the content storage. In some embodiments, each indicator (e.g., 310) in a map of the one or more maps (300) may be configured to indicate at least whether content (information, data) that may be stored in a corresponding block may be valid or invalid. In some embodiments, content that may be stored in a block associated with a content storage corresponding to a destination node of the one or more destination nodes (120a-k) may be indicated as valid content if the content is the same as (e.g. identical to) content stored in a corresponding block associated with the content storage corresponding to the source node (110), and indicated as invalid content otherwise.

FIG. 4 illustrates an example multicast transmission 410 and an example acknowledgement message (420). Multicast transmission 410 may contain block 413. Multicast transmission 410 may include a Multicast Acknowledgement Sequence Number (MASN) (411). Multicast transmission 410 may further include block index (412). Acknowledgement message (420) may be sent by a destination node of the one or more destination nodes (120a-k) to acknowledge reception of one or more blocks of data. Acknowledgement message (420) may include at least a first block MASN (421) that may correspond to a first block of data of the one or more blocks of data. Acknowledgement message (420) may further include a list of one or more indicators (422) that may correspond to one or more MASNs consecutively following the first block MASN.

FIG. 5 illustrates an example Acknowledged Multicast method that may be performed by source node (110) and at least one destination node of the one or more destination nodes (120a-k). In some embodiments, the source node (110) may be configured to determine a need to distribute or transmit content or data that may be stored in one or more blocks associated with the content storage corresponding to the source node (110) to the one or more destination nodes (120a-k). For example, the source node (110) may be configured to receive content from one or more data sources that may be coupled to the source node (110). The source node (110) may further be configured to store the content in one or more blocks associated with the content storage corresponding to the source node (110). The source node (110) may further be configured to determine, responsive to said storing, a need to distribute the content that may be stored in said one or more blocks. At step 501, the source node (110) may, upon determining a need to distribute one or more blocks associated with the content storage corresponding to the source node (110), transmit the content stored in each block of the one or more blocks using a multicast transmission (e.g., multicast transmission 410). In some embodiments, each multicast transmission may comprise the content of one block.

The source node (110) may be configured to associate each block being transmitted in a multicast transmission with a Multicast Acknowledgement Sequence Number (MASN) and with a block index. The source node (110) may further be configured to include the associated MASN (411) and the associated block index (412) in the multicast transmission (410) containing the respective block (413). For example, the source node (110) may be configured to include the associated MASN (411) and the associated block index (412) in a header that may be included in the multicast transmission. In some embodiments, the associated block index (412) may correspond to a location of the respective block (413) within the content storage (200) corresponding to the source node (110). In some embodiments, the source node (110) may be further configured to increase the MASNs associated with transmitted blocks by one with each block that may be transmitted, for example so that blocks that may be consecutively transmitted may be associated with consecutive MASNs.

A block associated with the content storage (e.g. corresponding to the source node (110)) may always be associated with the same block index. The same block may be assigned a first MASN value for transmitting its content in a first multicast transmission. The same block may be assigned a second MASN value for transmitting its content in a second multicast transmission, wherein the second MASN value may be different from the first MASN value (e.g. at least on one such occasion of first and second transmissions). As blocks of data may be transmitted in an unpredictable (e.g. random) order, the series that may comprise the block indexes corresponding to the transmitted blocks may (or may be likely to) lack any order, whereas the series of MASNs corresponding to the same transmitted blocks may be a series of consecutive numbers. Therefore, MASNs may be used for at least the purpose of efficiently acknowledging reception of multiple blocks that may be transmitted using multiple (consecutive) multicast transmissions (for example, as described further herein), e.g. regardless of which blocks may be transmitted and in which order.

The source node (110) may be configured to treat a block of data that may be transmitted (e.g. using a multicast transmission) as invalid (e.g. not received) for at least one destination node of the one or more destination nodes (120*a-k*) until receiving from the at least one destination node an acknowledgement message that may acknowledge reception of the block of data. At step 503, the source node (110) may be configured, responsive to transmitting a block of data (e.g. in a multicast transmission), to set one or more indicators in the one or more maps (300) that may correspond to one or more content storages corresponding to the one or more destination nodes (120*a-k*). The source node (110) may be configured to set in each map of the one or more maps (300) the respective indicator that may correspond to the block index corresponding to the transmitted block of data. Setting of the respective indicator may comprise setting the respective indicator to indicate that the content of the corresponding memory block at the corresponding destination node (of the one or more destination nodes (120*a-k*)) may be invalid (for example, setting the respective indicator to "0").

In some embodiments, a destination node of the one or more destination nodes (120*a-k*) may be configured to periodically generate and/or send one or more acknowledgement messages (420) to the source node (110) (e.g., over a return channel). Since acknowledgements may be based on MASNs while the content storages corresponding to the source node (110) and/or to the destination nodes (120*a-k*) may be managed using block indexes, the source node (110) may be configured to manage a transmission table, wherein the transmission table may comprise one or more records corresponding to one or more blocks of data that were transmitted (e.g. using multicast transmissions), and wherein each record of the one or more records may comprise an MASN (411) and a block index (412) that may have been assigned to a corresponding block of data in a respective multicast transmission (410). At step 505, the source node (110) may, upon transmitting a multicast transmission (410) (for example upon associating a block being transmitted with an MASN and with a block index, as previously described), add a record to the transmission table, wherein the added record may include the MASN (411) and the block index (412) of the multicast transmission (410).

At step 507, a destination node of the one or more destination nodes (120*a-k*) may receive a multicast transmission (410) from the source node (110). A destination node of the one or more destination nodes (120*a-k*) may be configured to receive at least one block of data (413), e.g., through receiving at least one multicast transmission (410), and to extract from the at least one multicast transmission (410) at least one of an MASN (411) and a block index (412) that may correspond to the received at least one block of data (413). In some embodiments, a destination node of the one or more destination nodes (120*a-k*) may be configured to receive one block of data (413) in each received multicast transmission (410). At step 509, the destination node of the one or more destination nodes (120*a-k*) may store the data received in the one or more multicast transmissions (410). The destination node of the one or more destination nodes (120*a-k*) may use a block index (412) received with the block of data (413) for at least the purpose of determining a memory block (relative position) inside a storage element associated with the destination node of the one or more destination nodes (120*a-k*). The destination node of the one or more destination nodes (120*a-k*) may store the received block of data (413) at the determined memory block.

At step 511, the destination node of the one or more destination nodes (120*a-k*) may generate one or more acknowledgment messages (420). In some embodiments, the destination node of the one or more destination nodes (120*a-k*) may be configured to use an MASN received with a block of data (411) for at least the purpose of acknowledging the received block of data (413). In some embodiments, a destination node of the one or more destination nodes (120*a-k*) may be configured to periodically generate and/or send one or more acknowledgement messages (420) to the source node (110) (e.g., over a return channel). A destination node of the one or more destination nodes (120*a-k*) may periodically generate and/or send one or more acknowledgement messages (420) to the source node (110) in accordance with a first interval (T1). The destination node of the one or more destination nodes (120*a-k*) may be configured to send an acknowledgement message (420) of the one or more acknowledgement messages for at least the purpose of acknowledging reception of one or more blocks of data that may be received (e.g. using one or more corresponding multicast transmissions) since sending of a previous acknowledgement message (420) of the one or more acknowledgement messages (e.g., during a last T1 interval). It may be noted that for at least the purpose of transmitting acknowledgement messages, there may be no need for time synchronization between destination nodes of the one or more destination nodes (120*a-k*). That is, each destination node of the one or more destination nodes (120*a-k*) may transmit its acknowledgement messages independently of any other destination node of the one or more destination nodes (120*a-k*). Moreover, lack of such timing synchronization may be advantageous, as it may result in distribution of acknowledgement messages over time (e.g. within each T1 period) and wherein such distribution may be further advantageous, for example in any of communication system 100 resources sizing (for example, sizing of the return channel) and source node 110 realization.

At step 513, the destination node of the one or more destination nodes (120*a-k*) may send one or more acknowledgment messages (420) to the source node (410). In some embodiments, a destination node of the one or more destination nodes (120*a-k*) may be configured to send an acknowledgement message (420) to acknowledge reception of the one or more blocks of data. The acknowledgement message (420) may comprise at least a first block MASN (421) that may correspond to the first block of data of the one or more blocks of data received since sending of a previous acknowledgement message. The acknowledgement message (420) may further comprise a list of one or more indicators (422) that may correspond to one or more MASNs consecutively following the first block MASN. The one or more consecutively following MASNs may be associated with blocks of data of the one or more blocks of data being acknowledged. In some embodiments, the list of indicators (422) may include at least one indicator for each block of data that may be acknowledged by the acknowledgement message (420) including for the first block of data that may be associated with the first block MASN (421). In some embodiments, the list of indicators (422) may include at least one indicator for each block of data that may be acknowledged by the acknowledgement message (420) except for the first block of data that may be associated with the first block MASN (421), for example since including the first block MASN in the acknowledgement message may be interpreted (e.g. by the source node (110)) as positive acknowledgement for receiving the corresponding first block of data of the one or more blocks of data being acknowledged. In some embodiments, the acknowledgement message (420) may also include an additional (e.g. short) header (not shown in FIG. 4). For example, the acknowledgement message (420) may also include an additional header in accordance with a protocol that may be used between the source node (110) and the one or more destination nodes (120*a-k*).

In some embodiments, the list of indicators (422) corresponding to consecutively following MASNs may comprise a bitmap, wherein each of the consecutively following MASNs may be associated with one or more bits of the bitmap and wherein the one or more bits of the bitmap corresponding to one of the consecutively following MASNs may indicate at least whether a block of data (multicast transmission) that may be associated with the respective one of the consecutively following MASNs may have been (correctly) received. In some embodiments, each of the consecutively following MASNs may be associated with one bit of the bitmap, wherein the one bit corresponding to one of the consecutively following MASN may be set to a first value (e.g. "1") to indicate that the respective block of data (multicast transmission) was received, or set to a second value (for example, that may be opposite to the first value, e.g. "0") to indicate that the respective block of data (multicast transmission) was not received (or not received correctly and therefore discarded).

At step 515, the source node (110) may receive one or more acknowledgement messages sent by a destination node of the one or more destination nodes (120*a-k*). At step 517, the source node (110) may be configured, responsive to receiving an acknowledgement message from a destination node of the one or more destination nodes (120*a-k*), to set one or more indicators in a map (of the one or more maps (300)) corresponding to the destination node. Setting of the one or more indicators may comprise setting one or more indicators that may correspond to one or more blocks of data that reception of which may be acknowledged in the received acknowledgement message. Setting the one or more indicators may further comprise setting the one or more indicators to indicate that the content of the corresponding one or more memory blocks at the corresponding destination node may be valid (for example, setting the one or more indicators to "1").

The source node (110) may be configured, e.g. upon receiving the acknowledgement message (420), to determine one or more block indexes corresponding to one or more blocks of data that may be acknowledged in the received acknowledgement message (420). The source node (110) may be configured to determine one or more block indexes corresponding to one or more blocks of data by using the transmission table. The source node (110) may translate acknowledged MASNs to their corresponding block indexes in the respective transmissions. The source node (110) may determine the one or more block indexes for at least the purpose of managing a map of the one or more maps (300) as previously described.

However, MASNs may not be uniquely assigned (e.g. by the source node (110)) to transmitted blocks of data. For example (as previously described) a block of data may be transmitted more than once and assigned different MASNs in different transmissions. In another example, since the representation of MASNs may be of finite length (e.g. 16 bits or 32 bits), MASNs may wrap-around after some time and at least one MASN value may be assigned to a first block of data in a first transmission and to a second block of data in a second (later) transmission, wherein the second block of data is different (e.g. corresponds to a different block index) than the first block of data. Since MASNs may eventually wrap-around, each record of the one or more records in the transmission table may be valid only for a limited time. Consequently, source node (110) may be configured to keep each record of the one or more records in the transmission table in accordance with a second interval (T2), and/or to remove at least one record of the one or more records from the transmission table in accordance with the second interval (T2), wherein the second interval (T2) may be shorter than a time interval it may take for MASNs to wrap-around (e.g. in accordance with any of the MASNs representation length, the rate of data transmission (e.g. in bps or any other suitable unit of measurement) and the block size (BS)). In some embodiments, wherein destination nodes (120*a-k*) may be configured to send acknowledgement messages (410) in accordance with a first interval (T1), the source node (110) may be configured to determine the duration of the second interval (T2) as equal to or longer than an interval that may correspond to the first interval (T1) plus a time it may take for information to be transmitted from the source node (110) to any of the destination nodes (120a-k) and back (e.g. a round-trip latency of the communication system (100)). It may be noted that the determining of the duration of the second interval (T2) and the removing of at least one record from the transmission table in accordance with the second interval (T2) may be based on an assumption that at least one destination node of the one or more destination nodes (120a-k) may not send an acknowledgement for receiving at least one block of data, and that an acknowledgement for receiving a block of data associated with the at least one record may not be received after the second interval (T2) expires (e.g. if an acknowledgement corresponding to a (multicast) transmission of a data block is not received within the second interval (T2) from the time it may be transmitted then such acknowledgement may never be received).

As previously described, a destination node of the one or more destination nodes (120a-k) may be configured to periodically generate and/or send one or more acknowledgement messages (420) to the source node (110) in accordance with a first interval (T1). Furthermore, the source node (110) may be configured to consider one or more memory blocks at a destination node (e.g. of the one or more destination nodes (120a-k)) as containing invalid content until receiving one or more acknowledgement messages (e.g. from the destination node) corresponding to one or more multicast transmissions containing blocks of data, the one or more blocks of data corresponding to the one or more memory blocks. Therefore, the longer the first interval (T1), the longer the time that the source node (110) may consider transmitted blocks of data as invalid in respect to one or more destination nodes (120a-k). However, it may be noted that the duration of the first interval (T1) may have a relatively small effect on the overall capacity (e.g. over a return channel) that may be needed for supporting acknowledgement messages (420). Alternatively, the first interval (T1) may be shortened without significantly increasing the overall capacity that may be needed for supporting acknowledgement messages (420).

As previously described, an acknowledgement message (420) may comprise a first block MASN field (421) and a list of one or more indicators (422), wherein the number of indicators (422) that may be included in an acknowledgement message (420) may correspond to the number of blocks of data being acknowledged in the acknowledgement message (420). Setting the first interval (T1) to a different duration may not affect the number of indicators that may be sent over a given period of time, since the number of indicators in an acknowledgement message may correspond to the number of blocks that may be acknowledged in the acknowledgement message, and the number of blocks that may be received (and therefore require acknowledgement) in the given period of time may be independent of the first interval (T1). The first interval (T1) may affect only the number of times that a first block MASN field (421) (and in some embodiments perhaps also a (short) header that may be included in an acknowledgement message) may be transmitted in a given period of time. Since the overhead (e.g. the first block MASN field (421) and possibly that additional (short) header) may be relatively small compared to the list of indicators, at least some of one or more destination nodes (120a-k) may be configured to use a relatively short first interval (T1) (for example, 10 seconds) without significantly increasing the capacity required (e.g. over a return channel) for supporting acknowledgement messages (420). In some embodiments, the source node (110) may be configured to control the first interval (T1) used by the one or more destination nodes (120a-k). The source node (110) may be configured to control the first interval (T1) by sending suitable control messages to the one or more destination nodes (120a-k)). The source node (110) may send one or more control messages to the one or more destination nodes (120a-k) to set the first interval (T1) to a relatively long duration (e.g. 5 minutes) for some or all of the one or more destination nodes (120a-k) at least some or most of the time. The source node (110) may also send one or more control messages to the one or more destination nodes (120a-k) to set the first interval (T1) to a relatively short duration (e.g. 10 seconds) for at least one of the one or more destination nodes (120a-k) responsive to determining a need to shorten an unavailability interval for one or more blocks of data in the at least one of the one or more destination nodes (120a-k).

The following example may illustrate the amount of memory that may be needed at the source node (110) in accordance with the above disclosure. Those skilled in the art may appreciate that this example does not limit the scope of the disclosure.

In some embodiments of the communication system (100), each content storage corresponding to the source node (110) and/or to a destination node of the one or more destination nodes (120a-k) may be 8 GBytes in storage capacity (e.g., $M=2^{33}$ Bytes) and may be (e.g., logically) segmented to 128K blocks (e.g., $N=2^{17}$ blocks), wherein each block may comprise 64 KBytes of storage capacity ($BS=M/N=2^{(33-17)}=2^{16}$ Bytes). Each indicator in the one or more maps (300) may be one (1) bit in size, hence each map of the one or more maps (300) corresponding to a content storage associated with a destination node of the one or more destination nodes (120a-k) may require only 16 KBytes (e.g., $2^{14}$) of memory (e.g., $2^{17}/8$, wherein 8 is the number of bits per byte). Such a relatively low memory requirement figure (e.g., 16 KBytes per destination node) may allow management of content storages corresponding to thousands of destination nodes using reasonable memory requirements. For example, content storages corresponding to 10,000 destination nodes (e.g. destination nodes 120a-k) may be managed using approximately 156.25 MBytes of memory. Furthermore, assuming that the multicast transmission (130) may be transmitted at a rate of 5 Mbps (DR), the entire content of the 8 GBytes content storage (M) at the source node (110) may be transmitted to the one or more destination nodes (120a-k) and updated in their respective content storages over a period of under 4 hours (e.g. $(M*8)/DR=2^{33+3}/(5*10^6) \approx 13{,}743.9$ seconds $\approx$ 3:49 hours).

In some embodiments, the first interval (T1, e.g. the destination nodes (120a-k) acknowledgement interval) may be set to 5 minutes. Given the above examples, an acknowledgement message (420) may acknowledge reception of up to about 2862 blocks (e.g. $(DR*T1)/BS=(5*10^6*5*60)/(2^{16}*8)=2861.02$). Assuming each block may be represented using a single bit in the list of indicators (422), the list of indicators (422) may be of approximately 358 bytes in size. Assuming that an acknowledgement message (420) may include also a first block MASN field (421) and perhaps additional headers, each destination node of the one or more destination nodes (120a-k) may transmit (e.g. over a return channel) an acknowledge message of less than 400 bytes every 5 minutes. Thus, at the cost of transmitting approximately 107 Kbps (e.g. $((400*8)*10{,}000)/300=106666.7$) over a return channel (e.g. by the one or more destination nodes (120a-k)), the source node (110) may obtain all the information it may need for at least the purpose of determining the status of each block in each content storage of 10,000 content storages corresponding to 10,000 destination nodes (e.g. 120*a-k*).

FIG. 6 illustrates an example method of using a stream compression technique. In an aspect of the disclosure, one or more methods of Acknowledged Multicast, as previously described, may be used in a point-to-multipoint (P2MP) communications system, such as communication system 100, for at least the purpose of supporting an efficient embodiment of data compression using a Stream Compression technique.

At step 601, the source node (110) may generate a compression dictionary. The source node (110) may generate a (compression) dictionary within a content storage (200) that may be associated with the source node (110). At step 603, the source node (110) may transmit the compression dictionary. The source node (110) may transmit the dictionary to the one or more destination nodes (120*a-k*). A destination node of the one or more destination nodes (120*a-k*) that may receive the dictionary may store a local copy of the dictionary. A destination node of the one or more destination nodes (120*a-k*) may store a local copy of the dictionary within a content storage (200) that may be associated with the destination node. A destination node of the one or more destination nodes (120*a-k*) may store a local copy of the dictionary for at least the purpose of decompressing data that may be compressed in accordance with the dictionary. The source node (110) may compress data in accordance with the dictionary before transmitting the (compressed) data to a destination node (of the one or more destination nodes (120*a-k*)) only if the source node (110) may determine before compressing the data that the destination node has a valid copy of at least a part of the dictionary that may be needed for compressing the data (e.g. so that the destination node, upon receiving the compressed data, may be able to successfully decompress the compressed data and restore the data to its original form).

Since communication system 100 may be a P2MP communication system, and since the same (compression) dictionary may be used for compressing data to be transmitted from the source node (110) to any of the one or more destination nodes (120*a-k*), the dictionary may be efficiently distributed to the one or more destination nodes (120*a-k*) using one or more multicast transmissions. Though multicast transmissions may be a non-reliable delivery service (e.g. a service that does not guarantee delivery), use of one or more Acknowledged Multicast methods (e.g. as previously described) may allow an efficient embodiment of Stream Compression in communication system 100, e.g. for at least the reason that guaranteed delivery of the dictionary may not be required.

The source node (110) may be configured to transmit to one or more destination nodes (120*a-k*) using one or more multicast transmissions. The one or more destination nodes may be configured to receive (e.g. from the source node (110)) one or more multicast transmissions. The one or more multicast transmissions may comprise at least a (compression) dictionary corresponding to a data compression method (for example, a Stream Compression method). Any of the source node (110) and/or the one or more destination nodes (120*a-k*) may be configured to at least transmit one or more parts of the dictionary, receive one or more parts of the dictionary, acknowledge reception of one or more parts of the dictionary, and determine validity of one or more parts of the dictionary in any of the one or more destination nodes (120*a-k*) in accordance with one or more Acknowledged Multicast methods, e.g. as previously described. At step 605, the source node (110) may receive one or more acknowledgement messages from at least one destination node of the one or more destination nodes (120*a-k*). The one or more acknowledgement messages may correspond to one or more parts of the compression dictionary included in one or more of the one or more multicast transmissions from the source node (110) to the destination node of the one or more destination nodes (120*a-k*).

At step 607, the source node (110) may set, in accordance with the received acknowledgement message, one or more indicators in a map (300) corresponding to the at least one destination node of the one or more destination nodes (120*a-k*). The source node (110) may set the one or more indicators to indicate that one or more parts of the compression dictionary corresponding to the received acknowledgement message are valid at the at least one destination node of the one or more destination nodes (120*a-k*).

At step 609, the source node (110) may determine whether data to be transmitted to a destination node of the one or more destination nodes (120*a-k*) (e.g. for at least one data transmission to a destination node of the one or more destination nodes (120*a-k*)) can be compressed in accordance with the compression dictionary transmitted at step 603. At step 611, the source node (110) may determine whether a part of the dictionary (e.g. that may be needed for compressing the data corresponding to the at least one data transmission) may be correctly stored at the destination node of the one or more destination nodes (120*a-k*). That is, the source node (110) may determine that one or more memory blocks of a content storage associated with the destination node may be valid. At step 613, the source node (110) may transmit the data to the destination node of the one or more destination nodes (120*a-k*). If the compression dictionary at the destination node of the one or more destination nodes (120*a-k*) is valid, the data transmitted from source node (110) may be compressed prior to transmission. Responsive to determining that the part of the dictionary may not be (correctly) stored at the destination node (e.g. invalid), the source node (110) may transmit the data corresponding to the at least one data transmission to the destination node without compressing the data.

It may be noted that since in any well-designed communication system (e.g. such as communication system 100) the one or more destination nodes (120*a-k*) may, at least for the most parts, correctly receive multicast transmissions (e.g. from the source node (110), the few occasions in which one or more parts of the dictionary may be lost (e.g. and therefore data may be transmitted from the source node (110) to any of the one or more destination nodes (120*a-k*) uncompressed) may have only a marginal effect on compression efficiency in the communication system (100). Furthermore, since the source node (110) may transmit data in uncompressed form upon determining that one or more parts of dictionary may not be available at one or more destination nodes (120*a-k*), no (e.g. often complicated) retransmissions mechanisms may be needed, neither for the multicast transmissions (e.g. that may comprise one or more parts of the dictionary) or for the (compressed) data.

In an aspect of the disclosure, a satellite communication system may comprise a hub and one or more terminals. The hub may be configured to transmit content to the one or more terminals using at least one or more multicast transmissions and the terminals may be configured to receive content (e.g. from the hub), for example through receiving at least the one or more multicast transmissions. In some embodiments, each of the one or more terminals may comprise and/or be associated with a storage configured at least for storing data.

Each of the one or more terminals may be configured to use at least a portion of its associated storage as a content storage, e.g. for at least the purpose of storing content that may be received from the hub in multicast transmissions. In some embodiments, one or more content storages corresponding to the one or more terminals may be all of a same capacity and (e.g. logically) segmented to one or more blocks of uniform size. The hub may also comprise a storage configured to be used at least in part as a content storage, e.g. for at least the purpose of storing content that may be transmitted to the one or more terminals in multicast transmissions. In some embodiments, the content storage corresponding to the hub may be (e.g. logically) segmented to one or more blocks of uniform size, wherein the capacity and the (e.g. logical) segmentation of the content storage corresponding to the hub may be similar to the capacity and (e.g. logical) segmentation of the one or more content storages corresponding to the one or more terminals, respectively.

In some embodiments, the hub and/or the one or more terminals may be configured to use one or more Acknowledged Multicast methods, e.g. the hub and/or the one or more terminals may be configured (without limitation) to at least transmit one or more blocks of content using one or more multicast transmissions, receive one or more blocks of content in one or more multicast transmissions, acknowledge reception of one or more blocks of content that may be received in one or more multicast transmissions, and determine validity of one or more block of content in any of the one or more terminals in accordance with one or more Acknowledged Multicast methods, e.g. as previously described.

Furthermore, the hub may be configured to generate and store a (compression) dictionary, e.g. within the content storage corresponding to the hub, and to distribute the dictionary to the one or more terminals using one or more multicast transmissions. A terminal of the one or more terminals that may receive the dictionary may be configured to store a local copy of the dictionary, e.g. within a content storage that may be associated with the terminal. The hub may be configured to determine, e.g. for at least one data transmission to a terminal (e.g. of the one or more terminals), whether at least part of the dictionary (e.g. that may be needed for compressing the data corresponding to the at least one transmission) may be (correctly) stored at the terminal (e.g. valid), and responsive to determining that the at least part of the dictionary may be (correctly) stored at the terminal to compress the data corresponding to the at least one transmission in accordance with the at least part of the dictionary, e.g. before transmitting the at least one data transmission to the terminal. The hub may be further configured, responsive to determining that the at least part of the dictionary may not be (correctly) stored at the terminal (e.g. invalid), to transmit the at least one data transmission to the terminal without compressing the data corresponding to the at least one transmission.

Various aspects of the disclosure may be embodied as one or more methods, systems, apparatuses (e.g., components of a satellite communication network), and/or computer program products. Accordingly, those aspects may take the form of an entirely hardware embodiment, an entirely software embodiment, an entirely firmware embodiment, or an embodiment combining firmware, software, and/or hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In some embodiments, one or more computer readable media storing instructions may be used. The instructions, when executed, may cause one or more apparatuses to perform one or more acts described herein. The one or more computer readable media may comprise transitory and/or non-transitory media. In addition, various signals representing data or events as described herein may be transferred between a source and a destination in the form of electromagnetic waves traveling through signal-conducting media such as metal wires, optical fibers, and/or wireless transmission media (e.g., air and/or space).

Modifications may be made to the various embodiments described herein by those skilled in the art. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

What is claimed is:

1. A method, comprising:

transmitting, from a source node in a communication system, at least one multicast transmission to one or more destination nodes of the communication system, the at least one multicast transmission comprising data corresponding to a block in a storage associated with the source node, a multicast acknowledgement sequence number (MASN), and a block index corresponding to a relative location of the block in the storage associated with the source node;

responsive to transmitting the at least one multicast transmission, setting, at the source node, one or more indicators corresponding to the block index included in the at least one multicast transmission, wherein the one or more indicators are included in one or more maps corresponding to one or more storages associated with the one or more destination nodes, and wherein setting the one or more indicators comprises setting the one or more indicators to indicate that the data stored in a corresponding block in the one or more storages associated with the one or more destination nodes is invalid;

responsive to transmitting the at least one multicast transmission, adding at least one record to a transmission table, wherein the at least one record comprises an MASN and a block index corresponding to the at least one multicast transmission;

receiving, at the source node, at least one acknowledgement message from at least one destination node of the one or more destination nodes, the acknowledgement message comprising a first MASN corresponding to a first multicast transmission of one or more multicast transmissions and one or more indicators corresponding to one or more MASNs consecutively following the first MASN, wherein each one of the one or more indicators is configured to indicate whether data corresponding to the respective MASN was correctly received at the at least one destination node of the one or more destination nodes; and responsive to receiving the at least one acknowledgement message from the at least one destination node of the one or more destination nodes, setting, at the source node, one or more indicators in a map corresponding to a storage associated with the at least one destination node in accordance with the first MASN and the one or more indicators of the at least one acknowledgement message, wherein setting the one or more indicators in the map comprises setting the one or more indicators in the map to indicate that one or more blocks in the storage associated with the at least one destination node are valid.

2. The method of claim 1, wherein the number of blocks in the storage associated with the source node is the same as the number of blocks in each of the one or more storages associated with the one or more destination nodes, and wherein all blocks in the storage associated with the source node and in the one or more storages associated with the one or more destination nodes are of a same size.

3. The method of claim 1, wherein the source node is configured to increase the MASN by one with each subsequent multicast transmission.

4. The method of claim 1, wherein setting one or more indicators in a map corresponding to a storage associated with the at least one destination node responsive to receiving at least one acknowledgement message from the at least one destination node comprises:
    determining, in accordance with any of the first MASN and the one or more indicators included in the acknowledgement message, at least one MASN corresponding to at least one block that was correctly received at the at least one destination node;
    translating the at least one MASN to at least one block index in accordance with at least one record included in the transmission table; and
    setting, in accordance with the at least one block index, at least one indicator corresponding to the at least one block in the map corresponding to the at least one destination node to indicate that the data stored in a corresponding at least one block in the storage associated with the at least one destination node is valid.

5. The method of claim 1, wherein the at least one destination node of the one or more destination nodes is configured to transmit the at least one acknowledgement message in accordance with a first interval, the method further comprising removing, at the source node, the at least one record from the transmission table in accordance with a second interval, wherein the second interval is shorter than a time interval it takes for MASNs to wrap-around, and wherein the second interval is of same duration or longer than the first interval plus a round-trip latency of the communication system.

6. The method of claim 1, wherein the communication system is a satellite communication system, wherein the source node is a hub of the satellite communication system and wherein the one or more destination nodes are one or more satellite communication terminals.

7. A method comprising:
    receiving, at a destination node in a communication system, one or more multicast transmissions from a source node in the communication system, the one or more multicast transmissions comprising data corresponding to one or more blocks in a storage associated with the source node and further comprising a multicast acknowledgement sequence number (MASN) and a block index corresponding to a relative location of a respective block in the storage associated with the source node;
    storing the data received in the one or more multicast transmissions in a storage associated with the destination node, wherein storing the data in the storage associated with the destination node comprises storing the data received in a multicast transmission of the one or more multicast transmissions in the storage in accordance with the block index included the multicast transmission;
    generating, in accordance with a first interval, at least one acknowledgement message, the at least one acknowledgement message comprising a first MASN corresponding to a first multicast transmission of the one or more multicast transmissions in accordance with the first interval and one or more indicators corresponding to one or more MASNs consecutively following the first MASN, wherein each one of the one or more indicators is configured to indicate whether the data corresponding to the respective MASN was correctly received; and
    transmitting the at least one acknowledgement message to the source node.

8. The method of claim 7, wherein the one or more indicators are included in a bitmap and wherein each of the one or more indicators comprises one or more bits in the bitmap.

9. A method comprising:
    transmitting, from a source node in a communication system to one or more destination nodes of the communication system, a compression dictionary using one or more multicast transmissions;
    receiving, at the source node, at least one acknowledgement message from at least one destination node of the one or more destination nodes, the acknowledgement message corresponding to one or more parts of the compression dictionary included in one or more of the one or more multicast transmissions;
    setting, at the source node, in accordance with the at least one acknowledgement message, one or more indicators in a map corresponding to the at least one destination node, wherein setting the one or more indicators comprises setting the one or more indicators to indicate that one or more parts of the compression dictionary corresponding to the at least one acknowledgement message are valid at the at least one destination node;
    determining, at the source node, that data to be transmitted to the at least one destination node can be compressed in accordance with at least one part of the compression dictionary;
    determining, at the source node, whether the at least one part of the compression dictionary is valid at the at least one destination node, wherein the determining is in accordance with the map corresponding to the at least one destination node; and
    transmitting the data to the at least one destination node without compressing the data if the at least one part of the compression dictionary is invalid at the at least one destination node.

10. The method of claim 9, wherein responsive to determining that the at least one part of the compression dictionary is valid at the at least one destination node, the method further comprises:
    compressing the data in accordance with the at least one part of the compression dictionary to generate compressed data; and
    transmitting the compressed data to the at least one destination node.

11. The method of claim 9, further comprising setting, at the source node, one or more indicators corresponding to at least one part of the compression dictionary corresponding to at least one multicast transmission of the one or more multicast transmissions, wherein the one or more indicators are included in one or more maps corresponding to the one or more destination nodes and wherein setting the one or more indicators comprises setting the one or more indicators to indicate that the at least one part of the compression dictionary is invalid at the one or more destination nodes.

12. The method of claim 9, wherein the communication system is a satellite communication system, wherein the source node is a hub of the satellite communication system and wherein the one or more destination nodes are one or more satellite communication terminals.

* * * * *